(12) United States Patent
Barnes et al.

(10) Patent No.: US 10,445,619 B2
(45) Date of Patent: Oct. 15, 2019

(54) AUTOMATIC GLANDULAR AND TUBULE DETECTION IN HISTOLOGICAL GRADING OF BREAST CANCER

(71) Applicant: Ventana Medical Systems, Inc., Tucson, AZ (US)

(72) Inventors: Michael Barnes, Oro Valley, AZ (US); Christophe Chefd'hotel, Sunnyvale, CA (US); Srinivas Chukka, San Jose, CA (US); Kien Nguyen, Ho Chi Minh (VN)

(73) Assignee: Ventana Medical Systems, Inc., Tucson, AZ (US)

( * ) Notice: Subject to any disclaimer, the term of this patent is extended or adjusted under 35 U.S.C. 154(b) by 48 days.

(21) Appl. No.: 15/418,632

(22) Filed: Jan. 27, 2017

(65) Prior Publication Data

US 2017/0140246 A1 May 18, 2017

Related U.S. Application Data

(63) Continuation of application No. PCT/EP2015/067007, filed on Jul. 24, 2015.
(Continued)

(51) Int. Cl.
*G06K 9/62* (2006.01)
*G06K 9/00* (2006.01)
(Continued)

(52) U.S. Cl.
CPC ......... *G06K 9/6227* (2013.01); *G06K 9/0014* (2013.01); *G06K 9/00127* (2013.01);
(Continued)

(58) Field of Classification Search
CPC ............ G06K 9/00127; G06K 9/0014; G06K 9/00147; G06K 9/4647; G06K 9/6227;
(Continued)

(56) References Cited

U.S. PATENT DOCUMENTS

| | | | |
|---|---|---|---|
| 8,644,582 B2* | 2/2014 | Yoshihara | G06T 7/0012 382/133 |
| 2007/0012886 A1* | 1/2007 | Tearney | A61B 10/02 250/459.1 |

(Continued)

OTHER PUBLICATIONS

Kien Nguyen et al., "Prostate Cancer Grading: Use of Graph Cut and Spatial Arrangement of Nuclei", IEEE Transactions on Medical Imaging, vol. 33, No. 12, Dec. 2014, pp. 2254-2270.*

(Continued)

*Primary Examiner* — Mekonen T Bekele
(74) *Attorney, Agent, or Firm* — Kilpatrick Townsend & Stockton LLP

(57) ABSTRACT

Methods, systems, and apparatuses for automatically identifying glandular regions and tubule regions in a breast tissue sample are provided. An image of breast tissue is analyzed to detect nuclei and lumen candidates, identify tumor nuclei and true lumen from the candidates, and group tumor nuclei with neighboring tumor nuclei and lumina to define tubule glandular regions and non-tubule glandular regions of the image. Learnt supervised classifiers, such as random forest classifiers, can be applied to identify and classify the tumor nuclei and true lumina. Graph-cut methods can be applied to group the tumor nuclei and lumina and to define the tubule glandular regions and non-tubule glandular regions. The analysis can be applied to whole slide images and can resolve tubule areas with multiple layers of nuclei.

12 Claims, 8 Drawing Sheets
(1 of 8 Drawing Sheet(s) Filed in Color)

Related U.S. Application Data

(60) Provisional application No. 62/030,009, filed on Jul. 28, 2014.

(51) Int. Cl.
*G06T 7/11* (2017.01)
*G06T 7/13* (2017.01)
*G06K 9/46* (2006.01)
*G06K 9/66* (2006.01)
*G06T 7/00* (2017.01)
*G06T 7/40* (2017.01)

(52) U.S. Cl.
CPC ....... *G06K 9/00147* (2013.01); *G06K 9/4647* (2013.01); *G06K 9/6256* (2013.01); *G06K 9/66* (2013.01); *G06T 7/0012* (2013.01); *G06T 7/11* (2017.01); *G06T 7/13* (2017.01); *G06T 7/40* (2013.01); *G06T 2207/30024* (2013.01); *G06T 2207/30068* (2013.01); *G06T 2207/30096* (2013.01)

(58) Field of Classification Search
CPC ...... G06K 9/6256; G06K 9/66; G06T 7/0012; G06T 7/11; G06T 7/13; G06T 7/40; G06T 2207/30024; G06T 2207/30068; G06T 2207/30096
See application file for complete search history.

(56) References Cited

U.S. PATENT DOCUMENTS

2007/0177786 A1* 8/2007 Bartels ............... G06K 9/00127
382/133
2009/0262993 A1* 10/2009 Kotsianti ........... G06K 9/00127
382/128
2011/0170754 A1* 7/2011 Yoshihara ............ G06T 7/0012
382/128

OTHER PUBLICATIONS

Kien Nguyen et al "Structure and Context in Prostatic Gland Segmentation and Classification", N. Ayache et al. (Eds.): MICCAI 2012, Part I, LNCS 7510, pp. 115-123, 2012.*
Shivang Naik et al., "Automated Gland and Nuclei Segmentation for Grading of Prostate and Breast Cancer Histopathology", 2008 IEEE, pp. 284-287.*
Basavanhally, A., et al., Incorporating Domain Knowledge for Tubule Detection in Breast Histopathology Using O'Callaghan Neighborhoods, Med. Imag., 2011, 1-15, 7963.
International Preliminary Report on Patentability dated Jan. 31, 2017 in corresponding PCT/EP2015/067007 filed on Nov. 17, 2015, pp. 1-14.
International Search Report and Written Opinion dated Aug. 21, 2015 in corresponding PCT/EP2015/067007 filed on Nov. 17, 2015, pp. 1-18.
Naik, S., et al., Automated Gland and Nuclei Segmentation for Grading of Prostate and Breast Cancer Histopathology, Biomed. Imag., 2008, 284-287, n/a.
Nguyen, K., et al., Prostate Cancer Grading: Use of Graph Cut and Spatial Arrangement of Nuclei, IEEE Transact. Med. Imag., 2014, 2254-2270, 33.
Nguyen, K., et al., Structure and Context in Prostatic Gland Segmentation and Classification, Med. Imag. Comp., 2012, 115-123, n/a.

* cited by examiner

* G (Tumor Nuclei)
- R (Lymphocytes Spots)
| Y (Stroma)

AUTOMATIC GLANDULAR AND TUBULE DETECTION IN HISTOLOGICAL GRADING OF BREAST CANCER

REFERENCE TO RELATED APPLICATIONS

This patent application is a continuation of International Patent Application No. PCT/EP2015/067007 filed Jul. 24, 2015, which claims the benefit of U.S. Provisional Application No. 62/030,009, filed Jul. 28, 2014. Each of the above patent applications is incorporated herein by reference as set forth in its entirety.

BACKGROUND OF THE DISCLOSURE

The present disclosure relates to the use of image analysis in the field of histology to identify glandular and tubule glandular regions in breast cancer tissue.

Histological grading is an important step in breast cancer prognosis. In the popular Nottingham Histologic Score (NHS) system for breast cancer grading (c.f. Breast Cancer Research and Treatment, 1992, Volume 22, Issue 3, pp 207-219, The Nottingham prognostic index in primary breast cancer, Marcus H. Galea et. al.), the pathologist analyzes tissue for tubule formation, nuclear pleomorphism and mitotic activity in the tumor regions and assigns a score of 1-3 for each factor. The scores from these three factors are added to give a final score, ranging from 3-9 to grade the cancer.

Tubule score is traditionally calculated by manually estimating the percentage of glandular regions in the tumor that form tubules, which is a time-consuming and subjective process. Others have attempted to automate this process.

For example, Dalle et al. proposed detecting tubules by: (i) segmenting the neoplasm regions (nuclei regions), (ii) applying different morphological operations to the neoplasm regions to segment the blob structures, and (iii) classifying blobs that contain white regions (lumina) as tubule formation.

Maqlin et al. proposed detecting tubules by: (i) segmenting the tissue image into stroma, nuclei and lumen using k-means clustering technique, (ii) finding nuclei boundary using the level set method, (iii) finding the nearest nuclei to each lumen and (iv) evaluating the distance between nuclei surrounding the lumen to estimate the evenness of the nuclei distribution around the lumen, which is used to identify the true tubules from the other white regions. In both the Dalle and Maqlin methods, tubules were identified by connecting each lumen to its closest nuclei. Since these methods only associate the lumen and its closest nuclei, they cannot handle cases in which a lumen is surrounded by multiple layers of nuclei, which can adversely affect the estimation of tubule percentage. Additionally, these methods rely on analysis of images that represent only a small segment of the whole slide tissue, which is not ideal. To our knowledge, no current methods are available that can address both of these deficiencies.

BRIEF SUMMARY OF THE DISCLOSURE

The present disclosure features, among other things, methods, systems, and apparatuses for automatically identifying tubule and non-tubule glandular regions in breast tissue samples as claimed, such as by: (a) identifying tumor nuclei and true lumina in the image; and (b) identifying glandular regions by grouping the tumor nuclei with neighboring lumina and neighboring tumor nuclei, wherein glandular regions containing true lumina are classified as tubule glandular regions, and wherein glandular regions lacking true lumina are classified as non-tubule glandular regions. Tubule percentage can then be calculated based on these two types of regions. The methods, systems, and apparatuses described herein can be applied to whole slide images and can resolve tubule areas with multiple layers of nuclei.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2A is an image of a hematoxylin and eosin (H&E) stained breast tissue, where dark blue areas correspond to nuclei, and where FIG. 2B is the same image after nuclei classification and analysis, where green spots (indicated by G) indicate tumor nuclei, red spots (indicated by R) indicate lymphocytes spots., and yellow spots (indicated by Y) indicate stroma;

FIG. 6A is an image of H&E stained breast tissue and FIG. 6B is the same image after segmentation, where blue regions indicate tumor tissue, yellow regions indicate lymphocytes, and cyan regions indicate stroma.

DETAILED DESCRIPTION OF THE DISCLOSURE

Figure 1:
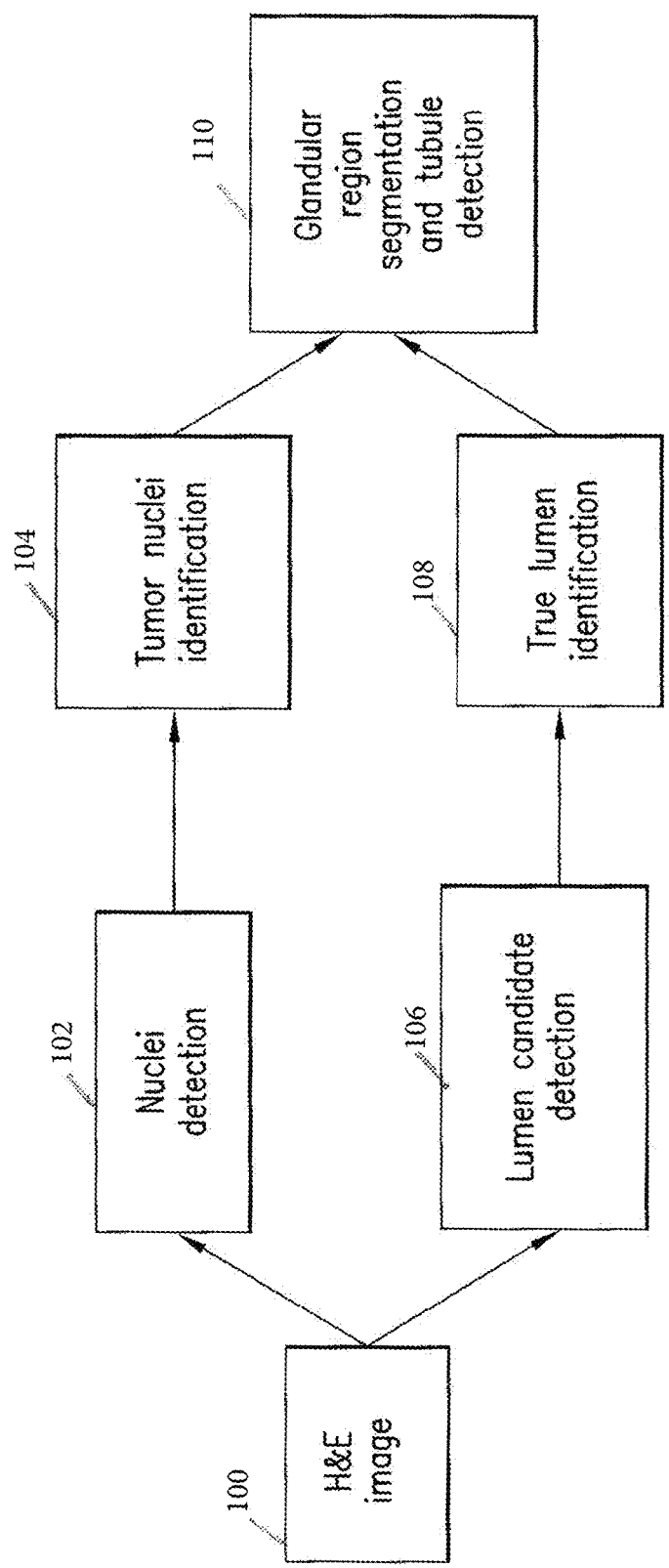
FIG. 1 demonstrates an exemplary workflow for identifying tubules.

Methods, systems, and apparatuses are provided for automatically identifying tubule glandular regions and non-tubule glandular regions in an image of a breast tissue sample by: (a) identifying tumor nuclei and true lumina in the image; and (b) identifying glandular regions by grouping the tumor nuclei with neighboring lumina and neighboring tumor nuclei, wherein glandular regions containing true lumina are classified as tubule glandular regions, and wherein glandular regions lacking true lumina are classified as non-tubule glandular regions. Tubule percentage and tubule score can then be calculated. Tubule percentage (TP) as understood herein is the ratio of the tubule area to the total glandular area. The analysis can be applied to whole slide images and can resolve tubule areas with multiple layers of nuclei. These methods, systems, and apparatuses are particularly useful in pathological scoring systems for breast tumors, such as NHS. Other utilities and advantages of the presently described methods, systems, and apparatuses will be readily apparent to those of skill in the art.

Tissue Samples and Image Data

The present methods, systems, and apparatuses are useful for the histological analysis of breast cancer tissues. The breast tissue is stained to differentially stain nuclei and other cellular and tissue structures and to aid in visualizing lumen. For example, a hematoxylin and eosin stain (H&E stain) can be used to stain breast tissue for histological analysis and tumor grading.

An image of the stained tissue is captured, transformed into data, and transmitted to a biological image analyzer for analysis, which biological image analyzer comprises a a processor and a memory coupled to the processor, the memory to store computer-executable instructions that, when executed by the processor, cause the processor to perform operations comprising the tubule classification processes disclosed herein. For example, the stained tissue may be viewed under a microscope, digitized, and either stored onto a non-transitory computer readable storage medium or transmitted as data directly to the biological image analyzer for analysis. As another example, a picture of the stained tissue may be scanned, digitized, and either stored onto a non-transitory computer readable storage medium or transmitted as data directly to a computer system for analysis.

In an exemplary embodiment, the stained tissue is present on a slide, and an image of the stained tissue is captured via a microscope.

Image analysis is preferably applied to an image of the entire stained tissue (such as the entire tissue present on a slide), although the user may select subsections of the image if desired.

Detection and Classification of Tumor Nuclei

Tumor nuclei may be identified by any method known in the art. For example, the image of the breast tissue may be analyzed by a pathologist and the tumor nuclei may be manually selected in the image. Subsequent automatic analysis may be performed as described herein to pair the tumor nuclei with neighboring nuclei and neighboring lumina to identify glandular regions. Tumor nuclei may also be identified automatically.

In one embodiment, tumor nuclei are automatically identified by first identifying candidate nuclei and then automatically distinguishing between tumor nuclei and non-tumor nuclei. Numerous methods of identifying candidate nuclei in images of tissue are known in the art. For example, automatic candidate nucleus detection can be performed by applying a radial-symmetry-base method, a radial-symmetry-based method of Parvin et al. on the Hematoxylin channel obtained using color deconvolution as described by Ruifrok et al.

In one exemplary embodiment, a radial symmetry based nuclei detection operation is used as described in commonly-assigned and co-pending patent application WO2014140085A1, the entirety of which is incorporated herein by reference.

After candidate nuclei are identified, they are further analyzed to distinguish tumor nuclei from other candidate nuclei. The other candidate nuclei may be further classified (for example, by identifying lymphocyte nuclei and stroma nuclei), although this step is not required and may be omitted.

In one embodiment, a learnt supervised classifier is applied to identify tumor nuclei. For example, the learnt supervised classifier is trained on nuclei features to identify tumor nuclei and then applied to classify the nucleus candidate in the test image as either a tumor nucleus or a non-tumor nucleus. Optionally, the learnt supervised classifier may be further trained to distinguish between different classes of non-tumor nuclei, such as lymphocyte nuclei and stromal nuclei.

In one embodiment, the learnt supervised classifier used to identify tumor nuclei is a random forest classifier. For example, the random forest classifier may be trained by: (i) creating a training set of tumor and non-tumor nuclei, (ii) extracting features for each nucleus, and (iii) training the random forest classifier to distinguish between tumor nuclei and non-tumor nuclei based on the extracted features. The trained random forest classifier may then be applied to classify the nuclei in a test image into tumor nuclei and non-tumor nuclei. Optionally, the random forest classifier may be further trained to distinguish between different classes of non-tumor nuclei, such as lymphocyte nuclei and stromal nuclei.

Detection and Classification of Lumina

The manner in which candidate lumina are identified from the image data depends upon the methodology used to stain the tissue. In one embodiment, lumina candidates are detected by applying a thresholding operation to a grayscale version of the image to identify. For example, in H&E stained tissues, candidate lumina will appear as "white spots" within a grayscale image, which can be automatically identified by setting an appropriate grayscale intensity cut-off.

Candidate lumina are analyzed to distinguish true lumina from the other candidate lumina. In one embodiment, a learnt supervised classifier is applied to distinguish true lumina from the other candidate lumina. For example, the learnt supervised classifier may be trained to distinguish true lumina from non-lumina regions by determining whether a ring of nuclei is disposed around the candidate lumen, which is indicative of a true lumen. In one embodiment, the learnt supervised classifier uses both tumor nuclei and non-tumor nuclei to distinguish true lumina from non-lumina regions. In another embodiment, the learnt supervised classifier uses all candidate nuclei to distinguish true nuclei from non-lumina regions. In another embodiment, the learnt supervised classifier is a random forest classifier.

In one embodiment, the method to determine true lumina includes:

(a) defining a boundary for each candidate lumen;
(b) identifying nuclei within a fixed distance d from the closest pixel on the boundary of the candidate lumen; and
(c) computing the features for each candidate lumen selected from the group consisting of:
   Nuclei distribution around the candidate lumen by dividing the area around the candidate lumen into N angular bins, and computing (i) the number of bins where nuclei are present, and (ii) the largest number of consecutive bins where nuclei are present; and
   a group of morphology features, such as area, circularity, solidity, and curvature of the candidate lumen, and grayscale intensity in the candidate lumen area; and
   a group of texture features, such as, histogram of intensity, histogram of gradient magnitude and orientation, co-occurrence features proposed in Haralick et al. in a patch of a predefined area around the lumina candidate.

Preferably, all of these features are computed. All tumor, stromal, and lymphocyte nuclei may be considered in this portion of the calculation, which helps avoid propagation of errors that may have been made during classification of tumor nuclei.

Automated Detection of Glandular Regions and Identification of Tubule Glandular Regions Glandular regions are identified in the image by grouping each tumor nucleus with its neighboring tumor nuclei and neighboring lumina. Tubule glandular regions are distinguished from non-tubule glandular regions based upon the presence or absence of true lumen in the glandular region.

In one embodiment, a graph-cut method is applied that comprises building a nuclei-lumen-graph for the image comprising vertices and edges, wherein each vertex represents a nucleus or a lumen, and wherein each edge represents a link between two nuclei or a link between a nucleus and a lumen, and wherein a normalized cut method is applied to partition the graph into different connected components. As one example, the graph-cut method may comprise:
(a) building a nuclei-lumen-graph for the image, wherein each vertex represents a nucleus or a lumen, and wherein each edge represents a link between two nuclei or a link between a nucleus and a lumen, wherein:
   (a1) a link is created between two nuclei if the distance between the two nuclei is less than a threshold $d_n$;
   (a2) a link is created for a lumen and a nucleus if the distance from the nucleus to the closest pixel on the lumen boundary is less than a threshold $d_l$; and
   (a3) a fixed weight is assigned to all edges; and
(b) recursively partitioning the graph into smaller components, until the cost of the cut exceeds a threshold $c_t$.

In accordance with some embodiments of the invention, the graph-cut method described in J. Shi and J. Malik, "Normalized cuts and image segmentation," IEEE Transaction on Pattern Analysis and Machine Intelligence, vol. 22, no. 8, pp. 888-905, 2000 (http://www.es.berkeley/edu/~malik/papers/SM-neut.pdf) may be utilized. In accordance with some embodiments of the invention, a cost function of the normalized cut method is used as defined in equation (2) of the original paper by J. Shi and J. Malik above. In accordance with embodiments of the invention, the threshold $c_t$ is selected empirically by evaluating the normalized cut cost values in several training images. For example a value of 0.2 may be a good choice for the threshold $c_t$. In accordance with some embodiments of the invention, the other thresholds are also selected empirically, i.e., we estimate threshold $d_n$ by manually observing the usual distance between 2 neighboring nuclei in a gland, and estimate threshold $d_l$ by manually observing the usual distance between the nuclei and the lumen of the same gland. In one embodiment, the graph-cut method does not use non-tumor to identify glandular regions.

Each segmented component is then classified as a tubule glandular region or a non-tubule glandular region, wherein a segmented component containing a true lumen is classified as a tubule glandular region and a segment component that does not contain a true lumen is classified as a non-tubule glandular region.

A tubule percentage and/or tubule score may be automatically calculated from the identified tubule glandular regions and non-tubule glandular regions such as by calculating the area covered by the tubule glandular regions, i.e. the tubule area, and calculating the area covered by all glandular regions, i.e. the total glandular area, such as by determining the area covered by the non-tubule glandular regions and adding the tubule area, and by then calculating tubule area/total glandular area. Additionally or alternatively, the tubule glandular regions and non-tubule glandular regions may be superimposed on an image of the evaluated tissue, which may then be saved electronically and/or displayed on a monitor or display and/or printed, which may then be evaluated manually by a pathologist to determine tubule percentage and/or tubule score.

Automated Segmentation of the Image

In one embodiment, the image may be further subject to a segmentation task to assign specific classifications to various regions of the tissue image. For example, the image could be segmented into tumor, stromal, normal, and lymphocyte regions, which could be useful in calculating a nuclear pleomorphism score and a mitotic activity score. An example of a method for automatically segmenting the image is described in U.S. Provisional Patent Application No. 61/932,671, the contents of which are incorporated by reference in their entirety. Based on this image, a pathologist may calculate a nuclear pleomorphism score and/or a mitotic activity score, which may be combined with a tubule formation score calculated with the aid of the presently described methods, apparatuses, and systems.

In one embodiment, an algorithm for evaluating an image 100 of an H&E stained breast tissue slide is developed, which: (i) detects all nuclei and lumen candidates in the image in step 102, (ii) uses a random forest classifier to identify tumor nuclei from the detected nuclei in step 104, detect lumen candidates in step 106 and identify true lumina from the lumen candidates in step 108, and (iii) forms the glandular regions by grouping closely located nuclei and lumina using a graph-cut-based method in step 110. If a glandular region contains lumina, it is considered to form a tubule structure. A flowchart of the developed method is illustrated at FIG. 1.

Figure 2A:
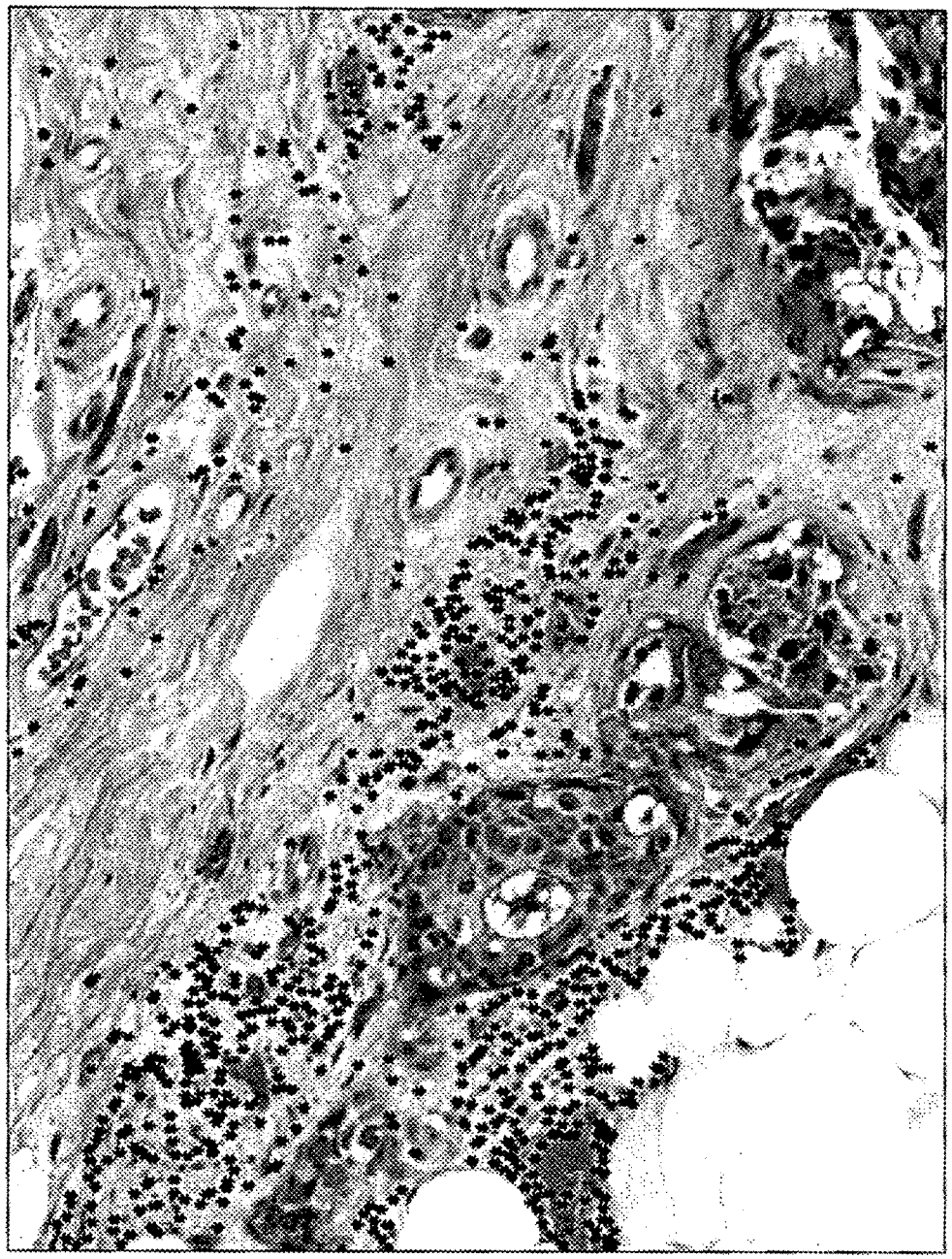
FIG. 2A and FIG. 2B demonstrate results of an exemplary image analysis for detecting and classifying nuclei, where
Figure 2B:

In one embodiment, nuclei detection (nuclei center detection) is performed by applying the radial-symmetry-based method of Parvin et al. on the Hematoxylin channel obtained using color deconvolution as described by Ruifrok et al. Tumor nuclei are identified from all the detected nuclei (which also contain lymphocytes, stroma nuclei, etc) using a classification-based approach by: (i) creating a training set of tumor and non-tumor nuclei, (ii) extracting features for each nucleus, (iii) training a random forest classifier using these features and (iv) classifying the nuclei in a test image into the two nuclei types using the random forest classifier. See, e.g., FIGS. 2A and 2B.

In one embodiment, Otsu's thresholding method (c.f. https://en.wikipedia.org/wiki/Otsu%27s_method; Nobuyuki Otsu (1979). "A threshold selection method from gray-level histograms". IEEE Trans. Sys., Man., Cyber. 9 (1): 62-66. doi:10.1109/TSMC.1979.4310076) is applied locally on the region surrounding each nuclei center (detected above) to segment the nuclei region. The features computed for each nucleus $n_0$ include:

Morphology features: area, circularity, and solidity of the nuclei;

Density of the neighboring nuclei in the neighborhood area (a patch of size S×S around $n_0$); and Texture features: histogram of intensity, histogram of gradient magnitude and orientation, co-occurrence features as described in Haralick et al. in the neighborhood area.

Figure 3:
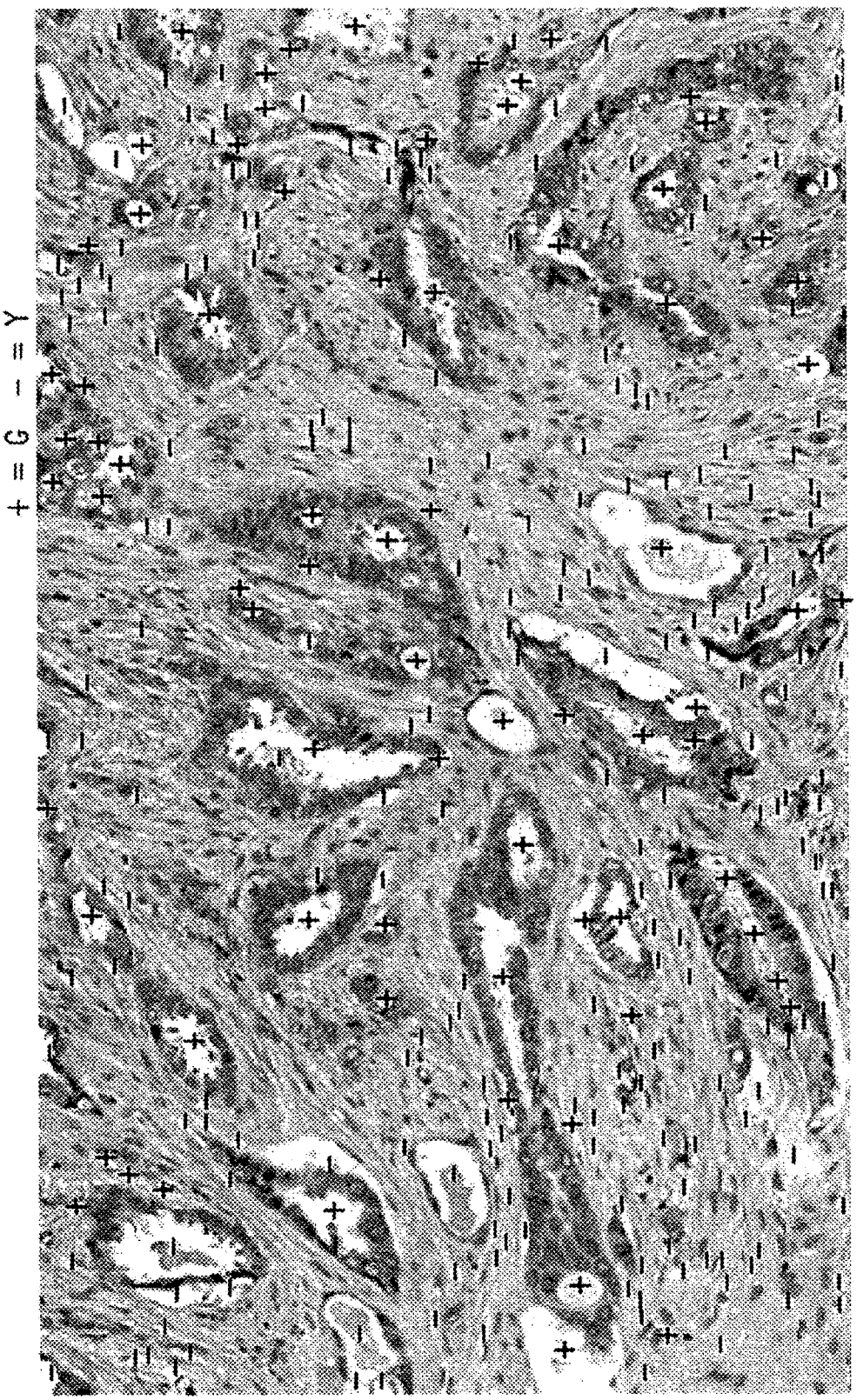
FIG. 3 is an exemplary image analysis for detecting and classifying lumina, where green spots (indicated by G) indicate true lumina, and yellow spots (indicated by Y) indicate other white regions.

In one embodiment, the presence of lumen—a white region surrounding by tumor nuclei—is a sign of tubule formation in the glandular regions. To detect lumen, (i) all lumen candidates (LCs)—the white regions—are found by applying a thresholding operation in the grayscale image. Besides true lumina, the LCs also contain non-lumina regions such as fat regions, broken tissue regions. To distinguish true lumina from these LCs, a classification-based approach is used to extract features from the LCs and classify them into true lumina vs non-lumina regions. See, e.g., FIG. 3.

A true lumen can often be surrounded by a ring of nuclei, while non-lumina regions do not have this property. We first identify nuclei associated with each LC, i.e., nuclei within a distance d from the closest pixel on the LC boundary. All detected nuclei (without classification result) for this feature extraction to avoid propagating errors from the nuclei classification task. The following features are computed for each LC:

Nuclei distribution around LC: we divide the area around the LC into N angular bins, and compute (i) the number of bins where nuclei are present, and (ii) the largest number of consecutive bins where nuclei are present;

Morphology features: area, circularity, solidity, and curvature of the LC, grayscale intensity in the LC area; and Texture features: histogram of intensity, histogram of gradient magnitude and orientation, co-occurrence features as described in Haralick et al. in the neighborhood area of the LC.

In one embodiment, a random forest classifier is again selected for this true lumina vs non-lumina regions classification task.

Figure 4:
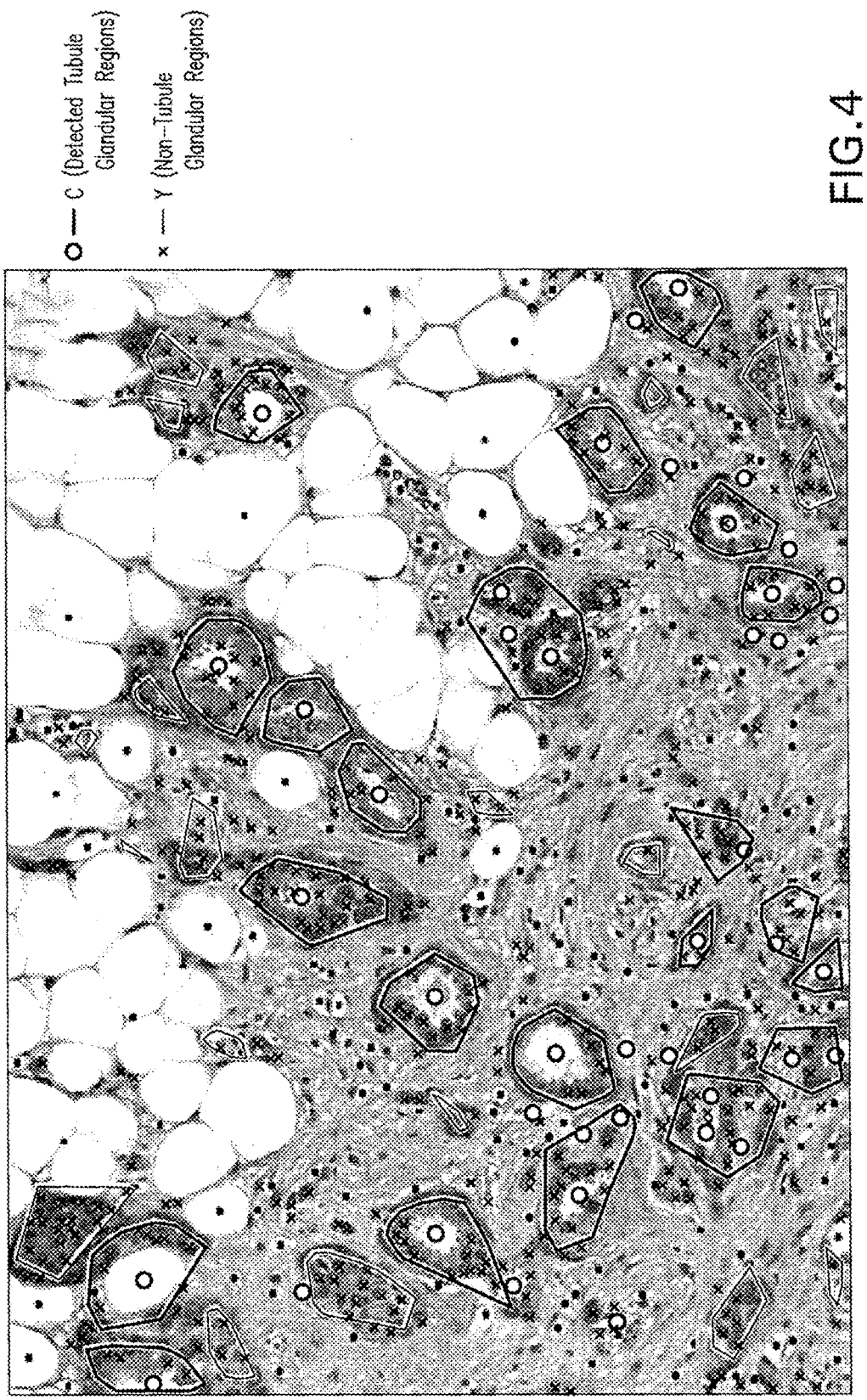
FIG. 4 demonstrates an exemplary analysis for glandular regions formation and detection of tubules, where cyan regions (indicated by C) are detected tubule glandular regions, and yellow regions (indicated by Y) are non-tubule glandular regions.

In one embodiment, once tumor nuclei and lumina are found, they are grouped together to generate glandular regions, since glandular regions are usually formed by either a group of tumor nuclei or a group of both lumina and the surrounding tumor nuclei. A nuclei-lumen-graph is built for the image, in which each vertex represents a nucleus or a lumen, while each edge represents a link between a nucleus and a nucleus or between a nucleus and a lumen. A link is created for two nuclei if their distance is less than a threshold $d_n$. A link is created for a lumen and a nucleus if the distance from the nucleus to the closest pixel on the lumen boundary is less than $d_l$. A weight of 1 is assigned to all the edges. Once the graph is created, a normalized cut method is applied to partition the graph into different connected components. This is done by recursively partitioning the graph (or components) into two smaller components, until the cost of the cut exceeds a threshold $c_t$. Since the normalized cut method aims to remove the set of weakest links (sparse links), the resultant components are likely to represent to the groups of closely located nuclei and lumina (with dense links between them). If a segmented component contains lumen, it is considered as a tubule glandular region, otherwise it is considered as a non-tubule glandular region. Components with too few nuclei (less than 3) are discarded. See FIG. 4 for an example.

Surprisingly, the nuclei-lumina graph construction method and the normalized cut for gland segmentation method which are as such known from http://www.cse.msu.edu/~nguye231/PDFs/TMI14_NucleibasedSegmentation.pdf (sections III B. and III. C.) for prostate cancer grading can be used for implementation of embodiments of the invention for generating and partitioning the nuclei-lumen-graph for the determination of the TP of a breast tissue sample.

Figure 5:
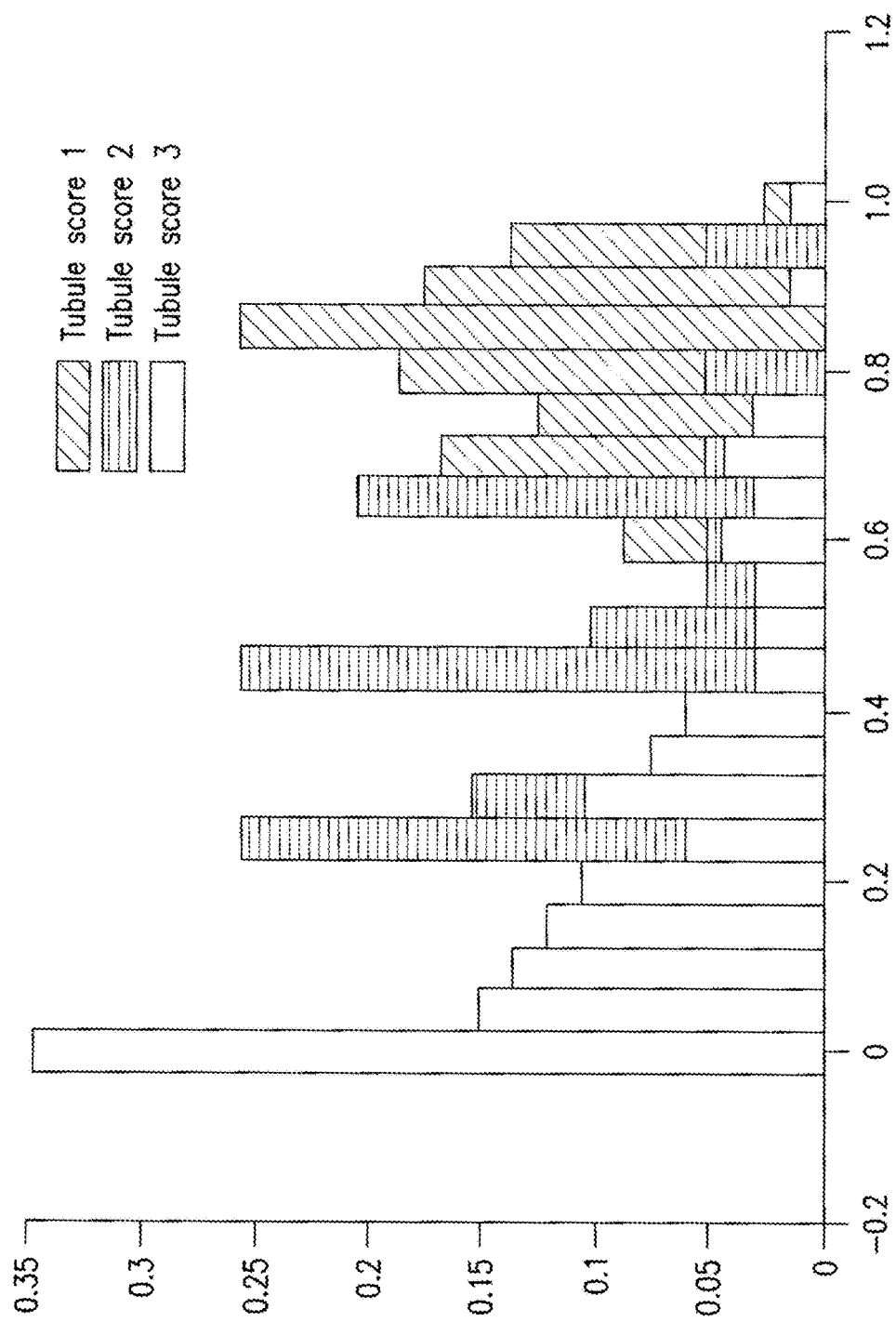
FIG. 5 is a bar graph showing normalized distribution of tubule percentage values for a number of test images determined manually to have Tubule Scores of 1, 2, or 3.
Figure 6B:
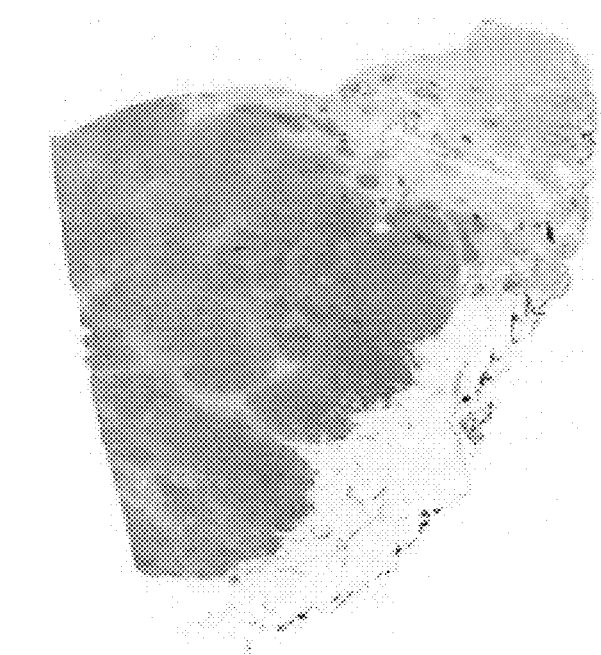
FIG. 6A and FIG. 6B demonstrate an exemplary image analysis for segmenting a whole slide, where
Figure 6A:
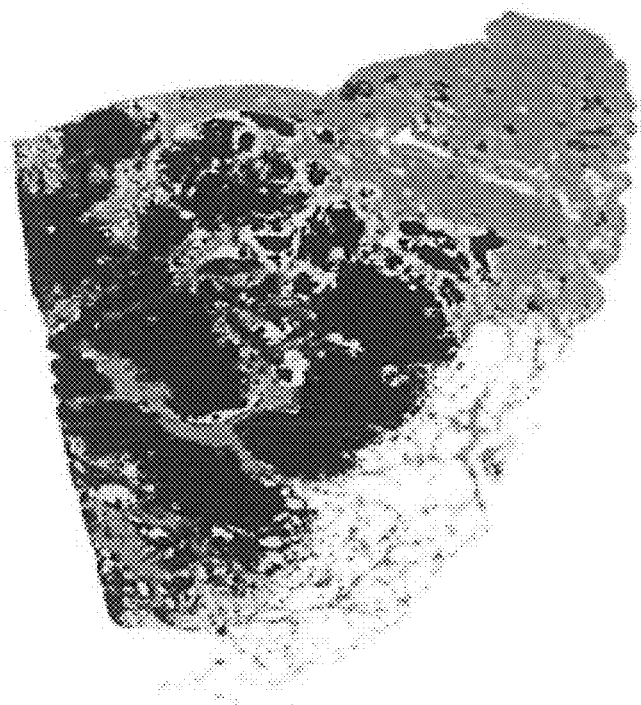
Figure 7:
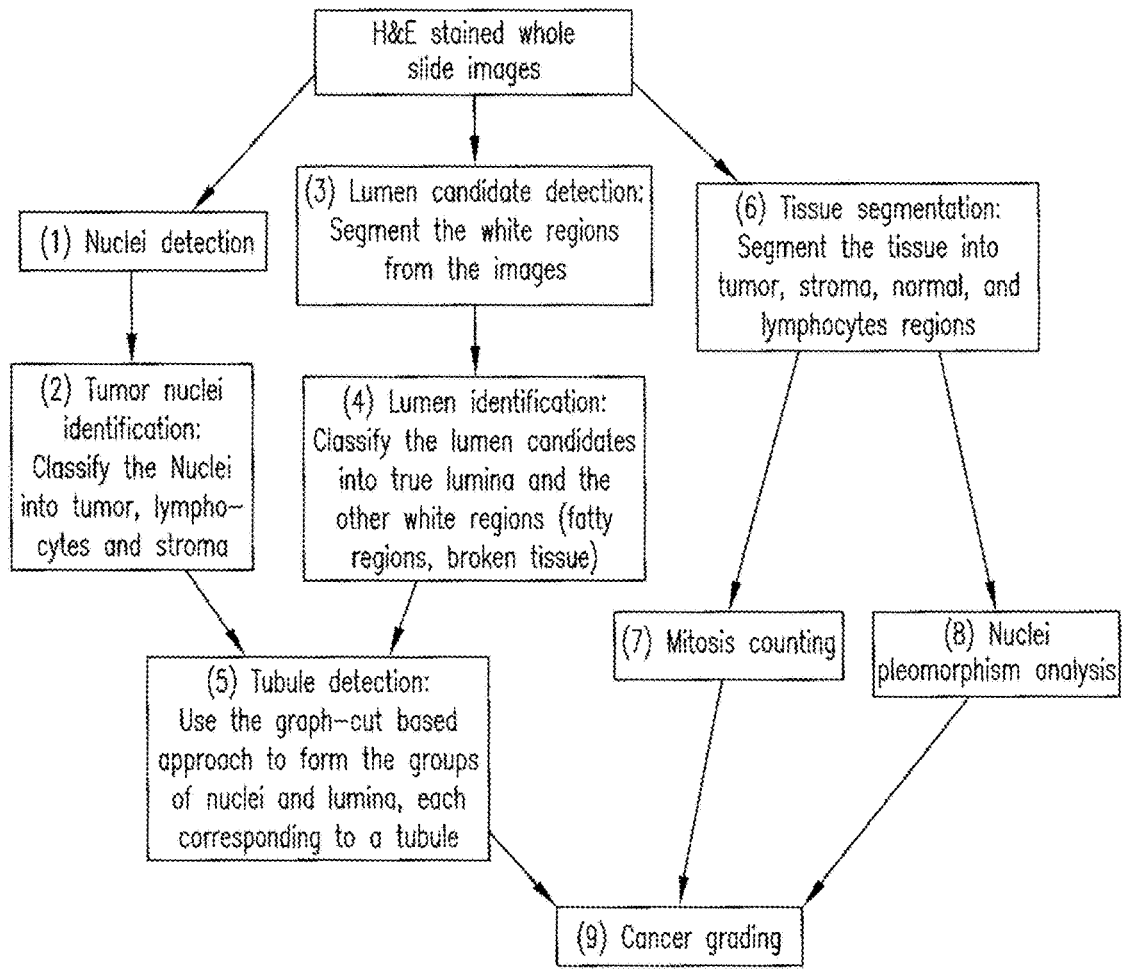
FIG. 7 demonstrates an exemplary workflow for histological grading of breast cancer using the presently described methods, systems, and apparatuses, where dark boxes indicate automatic modules while light boxes indicate manual tasks.

FIG. 5 shows example results of the methods discussed above. In this example, a database that includes 229 images with tubule score (TS) 1, 28 images with TS 2 and 96 images with TS 3, was used.

To show the usefulness of the proposed method, the TP was computed by calculating the ratio of the total tubule area to the total glandular area (which includes both tubule glandular regions and non-tubule glandular regions). See FIG. 2 for an example. The TPs for all images of the three different TS in the database were computed and the distribution of these TPs (after normalization) was plot in FIG. 5. As can be seen in this figure, there is a clear separation among the TP distributions of the three TS. This demonstrates that the TP values derived from the proposed method are useful for automatically distinguishing images of the three TS.

In this example, a tissue image was automatically graded as one of TS 1-3 by using TP as the only image feature. The method in Maqlin was further used as a comparison, because it purportedly reported very good results for the classification of breast histology images by using Gabor features and nuclei architectural features. A 10-fold cross-validation was performed on the image database. The average accuracy (with standard deviation) is reported in Table 1. In this table, we showed the results using the TP as the only feature, Gabor features, nuclei architectural features and their combination with the TP. A significant improvement in accuracy was obtained when the TP is used, demonstrating the usefulness of the proposed method in the automatic tubule scoring problem.

TABLE 1

| | TP as the only feature | Nuclei architectural features (NAF) | NAF + TP | Gabor features | Gabor features + TP |
|---|---|---|---|---|---|
| Accuracy (std) | 0.84 (0.04) | 0.68 (0.05) | 0.87 (0.04) | 0.73 (0.06) | 0.83 (0.06) |

The invention claimed is:

1. A method for automatically identifying tubule glandular regions and non-tubule glandular regions in a stained breast tissue sample, the method comprising:
   (a) detecting nuclei candidates and lumen candidates;
   (b) applying a random forest classifier to classify each nucleus candidate as a tumor nucleus or a non-tumor nucleus and to classify each lumen candidate as a true lumen or a non-lumina region;
   (c) identifying glandular regions in an image of the breast tissue sample by grouping each tumor nucleus with neighboring tumor nuclei and with neighboring lumina by a graph-cut method; and
   (d) classifying the glandular regions identified in (c) as either tubule or non-tubule, wherein a glandular region containing a true lumen is classified as tubule, and wherein a glandular region that does not contain a true lumen is classified as non-tubule.

2. The method of claim 1, wherein the graph-cut method comprises:
   building a nuclei-lumen-graph for the image comprising vertices and edges, wherein each vertex represents a tumor nucleus or a true lumen, and wherein each edge represents a link between two tumor nuclei or a link between a tumor nucleus and a true lumen; and
   applying a normalized cut method to partition the graph into different connected components.

3. The method of claim 2, wherein:
   the nuclei-lumen-graph for the image is built by at least:
      creating a link between two tumor nuclei if a distance between the two nuclei is less than a threshold dn;
      creating a link between a true lumen and a tumor nucleus if the distance from the tumor nucleus to the closest pixel on a boundary of a true lumen boundary is less than a threshold $d_l$; and
      assigning a fixed weight to all edges; and the normalized cut method comprises recursively partitioning the graph into smaller components, until cost of a further partition exceeds a threshold $c_t$.

4. The method of claim 1, wherein tumor nuclei are identified by detecting nuclei candidates in the image of the breast tissue sample and classifying the nuclei candidates as tumor nuclei or non-tumor nuclei, and wherein true lamina are identified by identifying lamina candidates and classifying the lamina candidates as true lamina or non-lumina regions.

5. The method of claim 1, wherein the random forest classifier for classifying the nuclei candidates as tumor nuclei or non-tumor nuclei is generated by at least:
creating a training set of tumor nuclei and non-tumor nuclei,
extracting features for each nucleus of the training set, and
training the random forest classifier using the extracted features.

6. The method of claim 1, wherein the random forest classifier distinguishes true lumina from non-lumina regions by at least:
defining a boundary comprising a plurality of pixels for each candidate lumen;
identifying nuclei within a distance d from the closest pixel on the boundary of the candidate lumen using all detected nuclei; and
computing at least the following features for each candidate lumen:
nuclei distribution around the candidate lumen, wherein nuclei distribution is determined by dividing an area around the candidate lumen into N angular bins, and computing (i) a number of bins where nuclei are present, and (ii) the largest number of consecutive bins where nuclei are present;
a group of morphology features comprising area, circularity, solidity, and curvature of the candidate lumen; and grayscale intensity in the candidate lumen; and
a group of texture features comprising a histogram of intensity, a histogram of gradient magnitude and orientation, and co-occurrence features in a predefined area around the lumen candidate.

7. The method of claim 1, wherein the stained breast tissue sample is a tissue sample stained with hematoxylin and eosin disposed on a slide, and wherein the image analyzed is an image of the whole tissue sample disposed on the slide.

8. A method of identifying true lumina in an image of a stained breast tissue, the method comprising detecting candidate lumina in the image of the stained breast tissue sample on an image analysis device and applying a random forest classifier to classify each candidate lumen as a true lumen or an artifact; wherein the method further comprises:
defining a boundary for each candidate lumen, the boundary of the candidate lumen comprising a plurality of pixels;
identifying all nuclei within a distance d from the closest pixel on the boundary of the candidate lumen; and
computing the following features for each candidate lumen:
nuclei distribution around the candidate lumen by dividing an area around the candidate lumen into N angular bins, and computing (i) a number of bins where nuclei are present, and (ii) the largest number of consecutive bins where nuclei are present;
a group of morphology features comprising: area of the candidate lumen, circularity of the candidate lumen, solidity of the candidate lumen, curvature of the candidate lumen, and grayscale intensity in the candidate lumen; and
a group of texture features comprising: a histogram of intensity, a histogram of gradient magnitude and orientation, and co-occurrence features in a predefined area around the lumen candidate.

9. A system for automatically identifying tubule glandular regions and non-tubule glandular regions in a stained breast tissue sample, the system comprising a biological image analysis device, wherein the image analysis device comprises:
a processor; and
a memory coupled to the processor, the memory to store computer-executable instructions that, when executed by the processor, cause the processor to perform operations comprising:
(a) detecting nuclei candidates and lumen candidates;
(b) applying a random forest classifier to classify each nucleus candidate as a tumor nucleus or a non-tumor nucleus and to classify each lumen candidate as a true lumen or a non-lumina region;
(c) identifying glandular regions in an image of the breast tissue sample by grouping each tumor nucleus with neighboring tumor nuclei and with neighboring lumina by a graph-cut method; and
(d) classifying the glandular regions identified in (c) as either tubule or non-tubule, wherein a glandular region containing a true lumen is classified as tubule, and wherein a glandular region that does not contain a true lumen is classified as non-tubule.

10. The system of claim 9, further comprising a microscope adapted to capture the image of the breast tissue sample and to communicate the image of the breast tissue sample to the image analysis device.

11. The system of claim 10, wherein the microscope is operably linked to the image analysis device.

12. A non-transitory computer-readable storage medium for storing computer-executable instructions that are executed by a processor to perform a method of identifying true lumina in an image of a stained breast tissue, the method comprising detecting candidate lumina in the image of the stained breast tissue sample on an image analysis device and applying a random forest classifier to classify each candidate lumen as a true lumen or an artifact; wherein the method further comprises:
defining a boundary for each candidate lumen, the boundary of the candidate lumen comprising a plurality of pixels;
identifying all nuclei within a distance d from the closest pixel on the boundary of the candidate lumen; and
computing the following features for each candidate lumen:
nuclei distribution around the candidate lumen by dividing an area around the candidate lumen into N angular bins, and computing (i) a number of bins where nuclei are present, and (ii) the largest number of consecutive bins where nuclei are present;
a group of morphology features comprising: area of the candidate lumen, circularity of the candidate lumen, solidity of the candidate lumen, curvature of the candidate lumen, and grayscale intensity in the candidate lumen; and a group of texture features comprising: a histogram of intensity, a histogram of gradient magnitude and orientation, and co-occurrence features in a predefined area around the lumen candidate.

\* \* \* \* \*